United States Patent
Akahori

(10) Patent No.: US 8,229,030 B2
(45) Date of Patent: *Jul. 24, 2012

(54) FSK SIGNAL MODULATOR FOR PRODUCING A BINARY FSK SIGNAL

(75) Inventor: Hiroji Akahori, Tokyo (JP)

(73) Assignee: Lapis Semiconductor Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/980,117

(22) Filed: Dec. 28, 2010

(65) Prior Publication Data

US 2011/0129034 A1  Jun. 2, 2011

Related U.S. Application Data

(63) Continuation of application No. 11/606,978, filed on Dec. 1, 2006, now Pat. No. 7,860,187.

(30) Foreign Application Priority Data

Dec. 28, 2005  (JP) ................................ 2005-377447

(51) Int. Cl.
    *H04L 27/12* (2006.01)
(52) U.S. Cl. ........................ 375/303; 375/334
(58) Field of Classification Search .................. 375/303, 375/334
    See application file for complete search history.

(56) References Cited

U.S. PATENT DOCUMENTS

| 6,915,084 B2 * | 7/2005 | Ho et al. | 398/208 |
| 7,860,187 B2 * | 12/2010 | Akahori | 375/303 |
| 2003/0030565 A1 * | 2/2003 | Sakatani et al. | 340/679 |
| 2004/0037363 A1 * | 2/2004 | Norsworthy et al. | 375/259 |

FOREIGN PATENT DOCUMENTS

| JP | 49-015351 | 2/1974 |
| JP | 56-043856 | 4/1981 |
| JP | 60-236344 | 11/1985 |
| JP | 63-209251 | 8/1988 |
| JP | 07-231337 | 8/1995 |

OTHER PUBLICATIONS

S.Haoka; Japanese Office Action; JP2005-377447; Nov. 30, 2010.

\* cited by examiner

*Primary Examiner* — Shuwang Liu
*Assistant Examiner* — Michael Neff
(74) *Attorney, Agent, or Firm* — Studebaker & Brackett PC; Donald R. Studebaker

(57) ABSTRACT

An FSK signal modulator is provided in a transmitter which receives desired information to be transmitted on its input and which modulates the information to be transmitted to transmit a binary FSK signal. A counter counts a value of addition with the value of addition modified in accordance with a predetermined rule, depending on the value specified by the information to be transmitted, and for holding the counted value. The count value is determined by a threshold value decision circuit with respect to a threshold value. The result from the decision is output in the form of binary FSK signal. An FSK signal modulator will be provided which is simplified in circuit constitution.

2 Claims, 3 Drawing Sheets

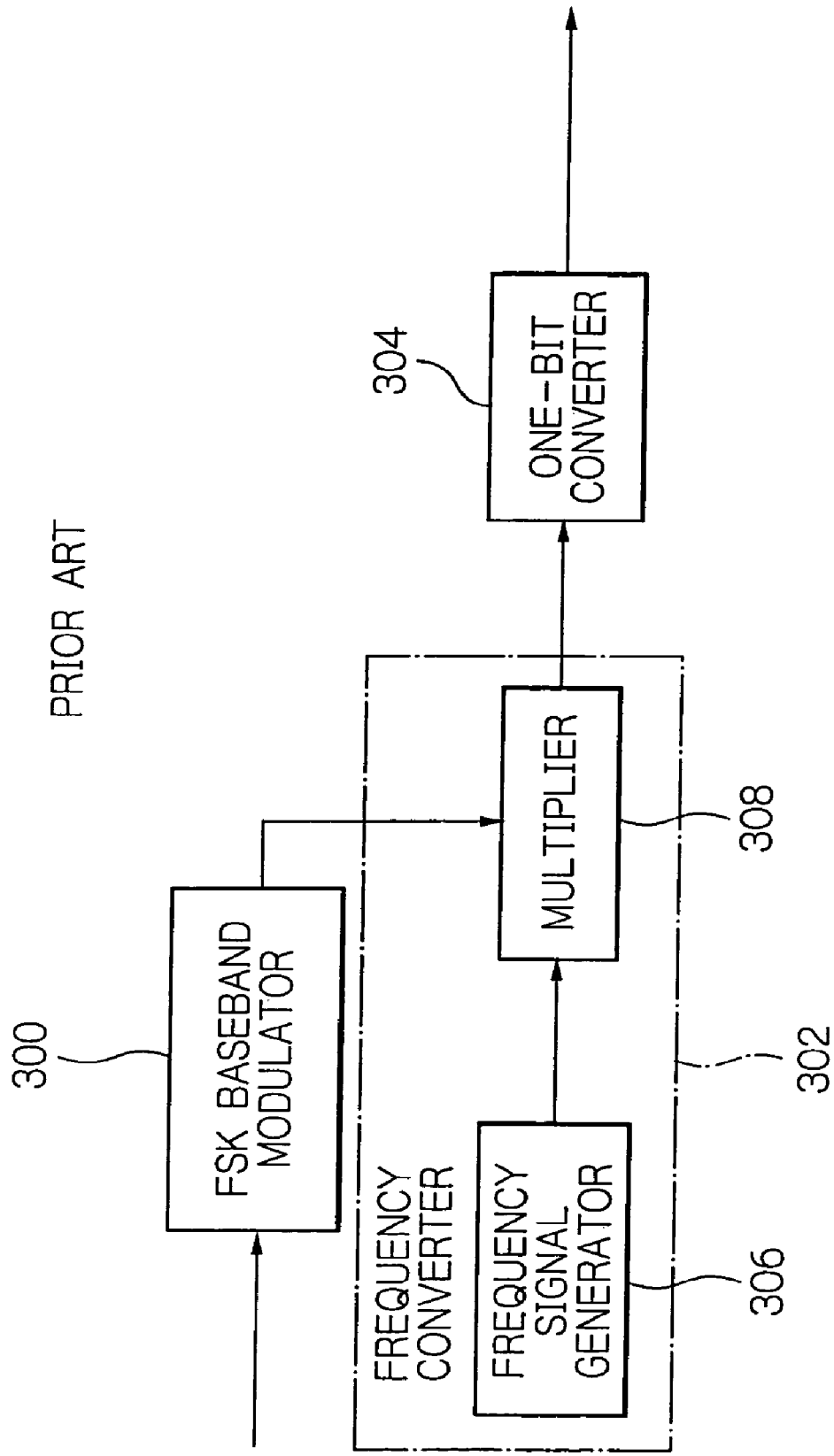

FSK SIGNAL MODULATOR FOR PRODUCING A BINARY FSK SIGNAL

BACKGROUND OF THE INVENTION

1. Field of the Invention

The present invention relates to a frequency shift keying (FSK) signal modulator for producing an FSK signal. More particularly, the present invention relates to an FSK signal modulator connectable to an FSK demodulator for receiving an FSK signal to perform digital signal processing thereon to produce a binary FSK signal.

2. Description of the Background Art

When an FSK signal corresponding to a digital signal resulting from quantization of a bit is to be received by an FSK demodulator, it is necessary for an FSK signal modulator connectable to the FSK demodulator to produce such an FSK signal in the form of binary signal corresponding to one bit. This type of FSK signal modulator has been disclosed in the Japanese patent laid-open publication No. 231337/1995.

However, an FSK demodulator adapted for receiving a binary input signal output from an analog receiver circuit and processing the signal in digital cannot accept an FSK signal transmitted from an FSK modulator adapted for processing in digital an input signal to produce the FSK signal in the form of multiple-value information, corresponding to plural bits or multi-bits when quantized. Hence, an FSK signal modulator capable of communicating with an FSK demodulator has to be provided not only with an FSK baseband modulator for producing a baseband modulated signal in the form of multiple-value or multiple-bit information but also with a frequency converter for converting the frequency component of the output signal of the modulator and with a one-bit converter for converting the frequency component into signals each corresponding to one bit.

Such a frequency converter further needs to be provided with a frequency generator for generating a multi-value frequency signal, providing the frequencies necessary for the one-bit conversion, and a multiplier for multiplying the multi-value output signal of the FSK baseband modulator with a multi-value frequency signal. With this multiplier, it is necessary to carryout two multiplication operations, that is, the multiplication operations on the real-number and imaginary-number axes. Thus, with the conventional FSK signal modulator, the circuit is increased in size, while difficulties are met in simplifying the circuit constitution.

SUMMARY OF THE INVENTION

It is therefore an object of the present invention to provide an FSK signal modulator with which it is possible to simplify its circuit constitution.

The present invention provides an FSK signal modulator for receiving information to be transmitted to produce a frequency shift keying (FSK) signal, which modulator includes a counter for counting a value of addition with the value of addition modified in accordance with a predetermined rule, depending on the value as specified by the information. The FSK signal modulator also includes a decision circuit for comparing a count value to a threshold value for decision and for generating a binary FSK signal which is in keeping with the result of the decision.

The counter may preferably be adapted to subtract, when the count value has exceeded a predetermined value, the predetermined value from the count, value.

The decision circuit may preferably be adapted in such a manner that the count value that may be taken by the counter is a positive integer not less than three, and out of the count values that can be taken by the counter a predetermined half plurality of consecutive count values are allotted to one of binary values "1" and "0" of one-bit information, while the remaining half plurality of consecutive count values are allotted to the other of the values "1" and "0" of the one-bit of information.

The counter may preferably be adapted in such a manner that, when a relationship of a center frequency of a modulation frequency component, a frequency of an FSK signal corresponding to "0" of the information to be transmitted and a frequency of an FSK signal corresponding to "1" of the information to be transmitted is defined by three smallest proportional integers as a first number, a second number and a third number, respectively, the counter adds the second and third numbers as indicating the frequencies of an FSK signal corresponding to the information signal "0" and "1", respectively, to the count value to increment the counter.

Preferably, the counter may further be adapted in such a manner that a fourth value obtained by dividing the sampling frequency for the FSK signal by the symbol rate of a modulation signal and multiplying a value resultant from the division by the first number may be used as the number of values that can be taken by the counter.

Further, the present invention also provides an FSK signal producing method for receiving information to be transmitted to produce a frequency shift keying (FSK) signal, which method includes a count step of counting a value of addition with the value of addition modified in accordance with a predetermined rule, depending on the value as specified by the information to be transmitted, and of holding a counted value. The method also includes a decision step of comparing the count value to a threshold value for decision and of producing a binary FSK signal which is in keeping with the result of the decision.

When the count value has exceeded a predetermined value, preferably the count step subtracts the predetermined value from the count value.

Preferably, the count values are a positive integer not less than three. Out of the count values that can be taken by the count step, in the decision step, a predetermined half plurality of consecutive count values are allotted to one of "1" and "0" of one-bit information, while the remaining half plurality of consecutive count values are allotted to the other of "1" and "0" of the one-bit information.

During the count step, when a relationship of a center frequency of a modulation frequency component, a frequency of an FSK signal corresponding to "0" of the information to be transmitted and a frequency of an FSK signal corresponding to "1" of the information to be transmitted is defined by three smallest proportional integers as a first number, a second number and a third number, respectively, the count step adds the second and third numbers as indicating the frequencies of an FSK signal corresponding to the information signal "0" and "1", respectively, to the count value to thus increment the count value.

Also preferably, a fourth value obtained by dividing the sampling frequency for the FSK signal by the symbol rate of a modulation signal and multiplying a value resultant from the division by the first number may be used as the number of values that can be taken in the count step.

According to the present invention, a binary FSK signal may be produced by a simplified circuit constitution comprised of an FSK signal modulator provided with a counter and a threshold value decision circuit.

BRIEF DESCRIPTION OF THE DRAWINGS

The objects and features of the present invention will become more apparent from consideration of the following detailed description taken in conjunction with the accompanying drawings in which:

FIG. 3 is a schematic block diagram showing an example of a conventional FSK modulator.

DESCRIPTION OF THE PREFERRED EMBODIMENT

Figure 1:
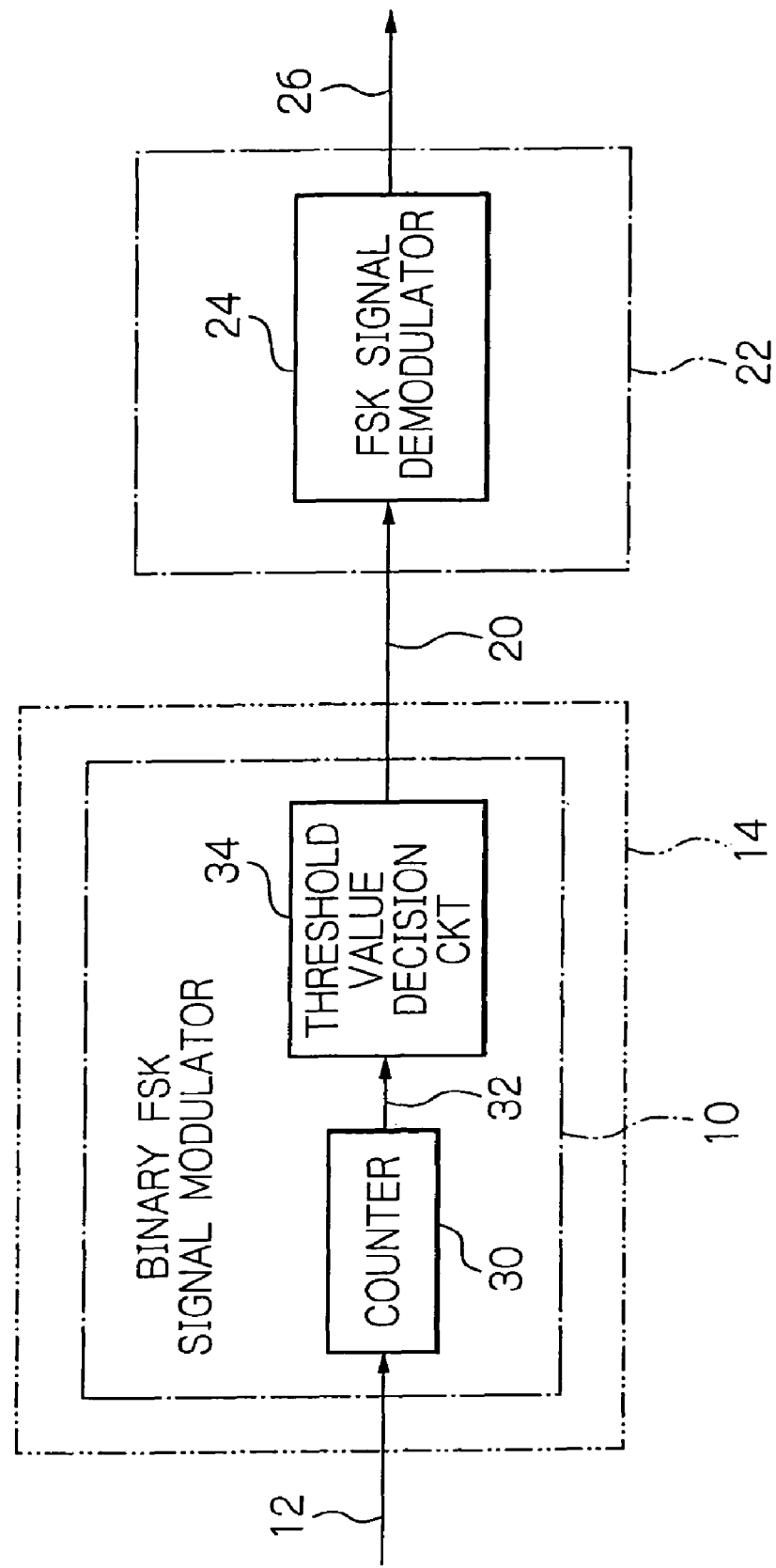
FIG. 1 is a schematic block diagram showing a transmitter and a receiver, the transmitter being provided with a binary FSK signal modulator embodying the present invention.

Referring to the accompanying drawings, a preferred embodiment of an FSK (Frequency Shift Keying) signal modulator according to the present invention will be described in detail. First, with reference to FIG. 1, an illustrative embodiment of an FSK signal modulator 10 according to the present invention is provided in a transmitter 14 adapted for receiving desired information to be transmitted on its input 12 and for modulating the information to be transmitted to transmit a resultant binary FSK signal. The transmitter 14 has its output 20 connected to a receiver 22 by a transmission channel 20. The receiver 22 is provided with an FSK demodulator 24 for demodulating the binary FSK signal, and develops the demodulated information on its output 26. In the following description, parts or components not directly relevant to understanding the present invention will not be shown nor described.

The binary FSK signal modulator 10, provided in the transmitter 14, includes a counter 30 for receiving and counting the information to be transmitted 12, and a threshold value decision circuit 34. The threshold value decision circuit is connected to an output 32 of the counter 30 and adapted for determining the output value of the counter 30 with respect to a threshold value to transmit an output representative of to the result of decision in the form of binary FSK signal from the output 20. In the description, signals are denoted by reference numerals designating connections on which they appear.

The counter 30 functions as taking a plurality d of count values ranging from integer values "0" to "d−1", where d is a positive integer exceeding two, for example, as will be described below in more detail. More specifically, the counter 30 is an adding and holding circuit for adding values b and c, which correspond to input binary information values "0" and "1", respectively, to a count which is held in the counter 30 and obtained one sampling period before, and holding a resultant value from the addition as a current count value. If the resultant value from the addition would be equal to or greater than the value d, then the counter 30 subtracts the value d from the resultant value and updates a current count value to a resultant value of the subtraction.

Specifically, the counter 30 operates in line with a rule or periodicity which will be described below. Let Fq_if [Hz] (hertz) be the center frequency of an input modulation frequency component of the FSK demodulator 24, and also let Fq_m [Hz] and Fq_s [Hz] be the frequency of FSK signals corresponding to binary information signals "0" and "1", respectively. Additionally, Sb [sps] (symbol per second) denotes the symbol rate of modulation signal, Spf [Hz] denotes the input sampling frequency of the FSK demodulator 24, Data denotes information for transmission taking a binary value "1" or "0", T denotes the sampling time of the counter 30 and Cnt(T) is a count value in the counter 30.

The counter 30 will be designed in the following manner. First, integer values a, b and c, are found out which satisfy the following condition:

$$a:b:c = Fq\_if : Fq\_m : Fq\_s. \quad (1)$$

Then, an integer value d, is determined which satisfies the following condition:

$$d = a \times (Spf/Sb). \quad (2)$$

Using these values a, b, c and d, the counter 30 is established which satisfies the following conditions:

$$Cnt(T) = Cnt(T-1) + b, \quad (3)$$

if input data=0 and Cnt(T−1)>d−b;

$$Cnt(T) = Cnt(T-1) + b - d, \quad (4)$$

if input data=0 and Cnt(T−1)≦d−b;

$$Cnt(T) = Cnt(T-1) + c, \quad (5)$$

if input data=1 and Cnt(T−1)>d−c; and $$Cnt(T) = Cnt(T-1) + c - d, \quad (6)$$

if input data=1 and Cnt(T−1)≦d−c.

The counter 30 constitutes an adder counter adapted for adding the value b or c, and holding the plurality d of count values, where d is a natural number exceeding two, i.e. not less than three and, more advantageously, not less than four. The counter 30 is adapted, as seen from the expressions (3) (4) (5) and (6) to add, at each sampling time, the value "b" or "c" corresponding to the information signal entered to the counter 30, i.e. input data "0" or "1", respectively, to a count held in the counter 30 and obtained at one sample period before, and to renew its current count to the result of the addition. If the resultant value of the addition would exceed the value "d", then the counter 30 subtracts this value "d" from the resultant value of the addition, and updates and holds a value resultant from the subtraction as a new current count.

The threshold value decision circuit 34 is adapted for verifying which of the output 32 of the counter 30 and a threshold value is greater, and producing an output "0" or "1", representing the result of the decision, to transmit the output over the transmission channel 20 in the form of binary FSK signal. The threshold value decision will proceed in the manner described below. The threshold value is set to a value equal to 2/d. Out of the plurality d of values that can be taken by the counter 30, the half plurality (d/2) of consecutive values are allotted to one binary value "1" or "0" of one-bit information to be entered to the FSK demodulator 24, while the remaining half plurality (d/2) of values are allotted to the other value "0" or "1" of the one-bit information, respectively. Thus, a bit of quantized input signal is formed which is directed to the FSK demodulator 24.

More specifically, when the threshold value decision circuit 34 determines that the count value Cnt (T) is equal to or smaller than the threshold value d/2, it allots the value Cnt(T) to a bit "0". When the threshold value decision circuit 34 determines that the count value Cnt(T) exceeds the threshold value d/2, it allots the value Cnt(T) to a bit "1". The threshold value decision circuit 34 outputs the so allotted "0" or "1" in the form of binary, quantized FSK signal 20. Meanwhile, if the value d is an odd number, the remainder obtained on division of the value d by two may be rounded down or up and the resulting value may then be used as the result of calculations.

Figure 2:
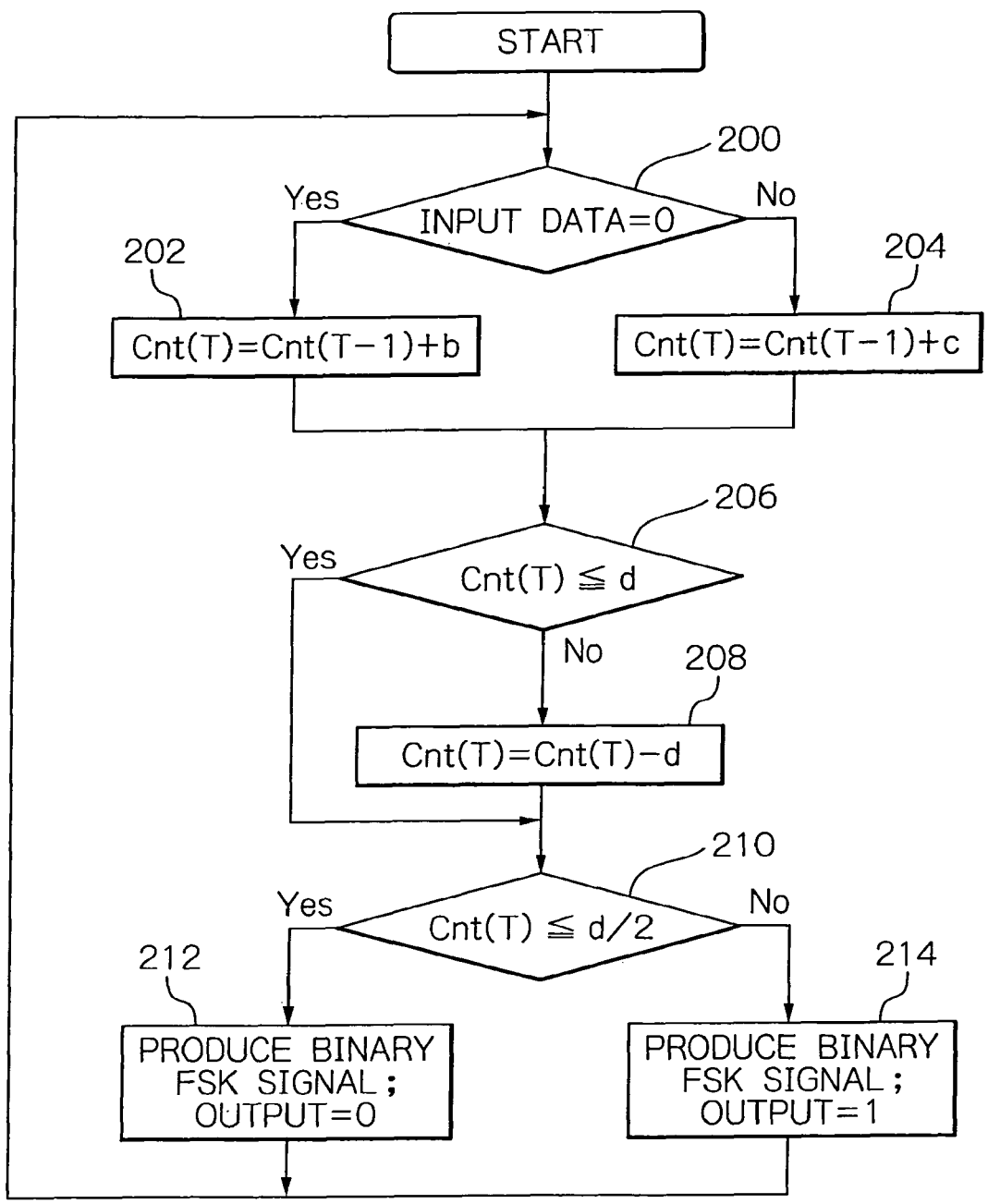
FIG. 2 is a flowchart useful for understanding the operation of the FSK signal modulator.

The operation of the binary FSK signal modulator 10 of the instant embodiment will now be described with reference to the flowchart of FIG. 2. Meanwhile, the counter 30 holds a count Cnt(T) which is resultant from applying values a to d determined in accordance with the above expressions (1) and (2) to the above expressions (3) to (6) defining the rules of addition.

Initially, in a step 200, it is verified whether or not the input data is of a value "0". If the input data is of the value "0", then the processing transfers to a step 202. Otherwise, the processing transfers to a step 204. In the step 202, the value b is added to the count Cnt(T−1) which is of one sample before, and the result of addition thus obtained is set as a new current count Cnt(T). In the step 204, the value c is added to the count Cnt(T−1) of one sample before, and the result of addition thus obtained is set as a renewed current count Cnt(T).

In a step 206, following the steps 202 and 204, it is verified whether or not the current count Cnt(T) has exceeded the value d. If the current count value Cnt(T) exceeds the value d, that is, if the condition Cnt(T)≦d is not met, the processing transfers to a step 208. If the current count value Cnt(T) does not exceed the value d, that is, if Cnt(T)≦d is met, then the processing transfers to a step 210. In the step 208, to which the processing transfers if Cnt(T)≦d is not met, the value d is subtracted from the current count value Cnt(T). The result of the processing thus obtained is set as a new current count value Cnt(T). The processing then transfers to the step 210.

In the step 210, threshold value decision processing for the current count value Cnt(T) held by the counter 30 is carried out by the threshold value decision circuit 34. Specifically, the current count value Cnt(T) is compared to the value d/2. If the current count value Cnt (T) is equal to or smaller than the value d/2, then the processing transfers to a step 212. If the current count value Cnt (T) exceeds the value d/2, then the processing transfers to a step 214. When the processing transfers to the step 212, the threshold value decision circuit 34 outputs the value "0" in the form of binary FSK signal. When the processing transfers to the step 214, the threshold value decision circuit 34 outputs the value "1" in the form of binary FSK signal. It is noted that the outputs "0" and "1" in the steps 212 and 214 may be reversed from each other. When the binary FSK signals are output in this manner, the processing reverts to the step 200 to initiate the input processing for the next sampling time. In this manner, the binary FSK signal quantized on the bit-by-bit basis will be transmitted to the FSK demodulator 24 on the receiver 22.

For a better understanding the invention, reference will be made to FIG. 3 which shows a conventional FSK modulator. An FSK signal modulator directly connectable to an input of an FSK demodulator needs to be provided not only with an FSK baseband modulator 300 for producing a multi-value baseband modulation signal, but also with a frequency converter 302 for converting the frequency component of the output signal of the modulator 300 and a one-bit converter 304 for converting the frequency-converted signal into signals each of which corresponds to one bit.

The frequency converter 302 is provided with a frequency signal generator 306 for generating a multi-value frequency signal required for the one-bit conversion, and with a multiplier 308 for multiplying an output signal of the modulator 300 with the multi-value frequency signal. The multiplier 308 executes two multiplication operations, that is, multiplication operations on the real-number and imaginary-number axes. Hence, with the conventional FSK signal modulator, the circuitry is so bulky that it is difficult to simplify the circuit configuration.

By contrast, with the binary FSK signal modulator 10 of the instant embodiment, it is possible to produce the binary FSK signal with a simplified circuit structure including the counter 30 and the threshold value decision circuit 34.

The entire disclosure of Japanese patent application No. 2005-377447-filed on Dec. 28, 2005, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A frequency shift keying (FSK) signal modulator comprising:
   a counter for receiving and counting information to be transmitted; and
   a threshold value decision circuit connected to an output of the counter for determining the output value of the counter with respect to a threshold value to transmit an output representative of a result of decision in the form of binary FSK signal,
   wherein said modulator determines a center frequency of an input modulation frequency component of an FSK demodulator connected with the modulator, a first and second frequencies of FSK signals respectively corresponding to binary information signals "0" and "1", a symbol rate of modulation signal, and an input sampling frequency of the FSK demodulator, finds out first, second and third integer values corresponding with a ratio of center, first and second frequencies, and calculates a fourth integer value by dividing the input sampling frequency by the symbol rate and multiplying the divided result by the first integer, and
   wherein said counter decides whether or not the information to be transmitted (input data) is equal to "0", and then, adds the second or third integer to a last count value obtained at one sampling period before when input data is equal to "0" or "1", respectively, to hold the added result as a held count value obtained in the counter at a current sampling period, and further decides whether or not the held count value is greater than the fourth integer, and then, renews a current count value by subtracting the fourth integer from the held count value or by remaining the held count value when the held count value is greater than the fourth integer or equal to the fourth integer or less, respectively,
   said threshold value decision circuit decides whether or not the current count value is greater than a half of the fourth integer, and then, outputs a value of "0" or "1" as the binary FSK signal when the current count value is greater than a half of the fourth integer or equal to a half of the fourth integer or less, respectively.

2. A method of receiving information to be transmitted to produce a frequency shift keying (FSK) signal in an FSK signal modulator comprising a counter for receiving and counting the information and a threshold value decision circuit connected to an output of the counter for determining the output value of the counter with respect to a threshold value to transmit an output representative of a result of decision in the form of binary FSK signal, comprising:
   determining a center frequency of an input modulation frequency component of an FSK demodulator connected with the modulator, a first and second frequencies of FSK signals respectively corresponding to binary information signals "0" and "1", a symbol rate of modulation signal, and an input sampling frequency of the FSK demodulator;

finding out first, second and third integer values corresponding with a ratio of center, first and second frequencies; calculating a fourth integer value by dividing the input sampling frequency by the symbol rate and multiplying the divided result by the first integer;

deciding whether or not the information to be transmitted (input data) is equal to zero, and then, adding the second or third integer to a last count value obtained at one sampling period before when input data is equal to zero or one, respectively, to hold the added result as a held count value obtained in the counter at a current sampling period;

deciding whether or not the held count value is greater than the fourth integer, and then, renewing a current count value by subtracting the fourth integer from the held count value or by remaining the held count value when the held count value is greater than the fourth integer or equal to the fourth integer or less, respectively; and deciding whether or not the current count value is greater than a half of the fourth integer, and then, outputting a value of zero or one as the binary FS K signal when the current count value is greater than a half of the fourth integer or equal to a half of the fourth integer or less, respectively.

\* \* \* \* \*